United States Patent
Park

(10) Patent No.: US 10,239,309 B2
(45) Date of Patent: Mar. 26, 2019

(54) IMAGE PROCESSING METHOD, AUTOMATIC IMAGE PRINTING METHOD, AND AUTOMATIC PRINTING APPARATUS NOZZLE

(71) Applicant: ROBOPRINT CO., LTD., Gyeongsan-si, Gyeongsangbuk-do (KR)

(72) Inventor: Jung Kyu Park, Daegu (KR)

(73) Assignee: ROBOPRINT CO., LTD., Gyeongsan-si (KR)

( * ) Notice: Subject to any disclaimer, the term of this patent is extended or adjusted under 35 U.S.C. 154(b) by 0 days.

(21) Appl. No.: 15/644,797

(22) Filed: Jul. 9, 2017

(65) Prior Publication Data

US 2018/0326720 A1  Nov. 15, 2018

(30) Foreign Application Priority Data

May 12, 2017 (KR) .......................... 10-2017-0059222

(51) Int. Cl.
  *G06T 3/40*  (2006.01)
  *B41J 2/045*  (2006.01)
(52) U.S. Cl.
  CPC ....... *B41J 2/04508* (2013.01); *B41J 2/04581* (2013.01); *G06T 3/403* (2013.01)
(58) Field of Classification Search
  CPC .............................. B41J 11/001; B41J 3/4073
  See application file for complete search history.

(56) References Cited

U.S. PATENT DOCUMENTS

| 5,389,476 | A | * | 2/1995 | Kruchko | B41M 3/12 101/DIG. 36 |
| 6,608,929 | B1 | * | 8/2003 | Shiratani | G06T 7/11 358/464 |
| 6,729,706 | B1 | * | 5/2004 | Patton | B41J 2/01 347/2 |
| 7,542,584 | B2 | * | 6/2009 | Abe | G06T 1/0021 380/283 |
| 8,139,872 | B2 | * | 3/2012 | Howell | G06F 17/30905 345/555 |
| 9,266,353 | B2 | * | 2/2016 | Beier | B41J 3/4073 |
| 9,659,241 | B1 | * | 5/2017 | Norasak | G06K 15/021 |
| 2001/0017085 | A1 | * | 8/2001 | Kubo | B41J 2/01 101/35 |
| 2007/0062383 | A1 | * | 3/2007 | Gazeau | B41J 3/4073 101/35 |
| 2012/0257256 | A1 | * | 10/2012 | Wakui | H04N 1/405 358/3.06 |

* cited by examiner

*Primary Examiner* — John Zimmermann
(74) *Attorney, Agent, or Firm* — Maschoff Brennan

(57) ABSTRACT

An image processing method includes a first step of matching the image to the target surface, a second step of dividing the target surface into a plurality of preliminary divided regions, a third step of acquiring a first preliminary divided region among the plurality of preliminary divided regions, a fourth step of dividing the target surface into a plurality of final divided regions, on the basis of a preliminary divided image included in the first preliminary divided region of the image matched to the target surface, and a fifth step of setting a print starting position for respective final divided images included in the plurality of final divided regions by using a boundary line that defines the plurality of final divided regions.

9 Claims, 17 Drawing Sheets

IMAGE PROCESSING METHOD, AUTOMATIC IMAGE PRINTING METHOD, AND AUTOMATIC PRINTING APPARATUS NOZZLE

CROSS-REFERENCE TO RELATED APPLICATION

This application claims priority to and the benefit of Korean Patent Application No. 10-2017-0059222, filed on May 12, 2017, the disclosure of which is incorporated herein by reference in its entirety.

BACKGROUND

1. Field of the Invention

The present invention relates to an image processing method, an automatic image printing method, and an automatic printing apparatus nozzle for automatically printing an image on a target surface of a structure.

2. Discussion of Related Art

When attempting to paint an outer wall of a structure or realize various types of images such as a drawing, a letter, a symbol, and a logo for an image on a structure, a worktable has conventionally been suspended by a rope to be vertically movable using a gondola and the like on a rooftop of a structure, and a worker has directly performed a painting task or an imaging task while on the worktable, or the worker has performed the painting task or the imaging task while climbing down a rope fixed to the rooftop.

Particularly, when painting an image on an outer wall of a structure, a designer marks a sketch on a wall surface of the structure using the same means and methods as above, and then a painter paints the marked sketch using a brush or a paint roller.

However, since this kind of painting task or imaging task requires a worker to directly perform the task at a high position at an outer wall of a structure, the worker is constantly exposed to a danger of falling, and the danger is increased even more on a day with strong winds.

In addition, due to performing a painting task or an imaging task at a high position, the worker cannot freely move. Thus, the painting task or the imaging task is slowed, and a task performing period is extended.

In addition, other than a danger of industrial accidents, due to a characteristic of a painting task in that the painting task is manually performed by a worker, labor costs unnecessarily increase and become a cause of increasing construction costs.

In this way, when attempting to paint an outer wall of a structure or realize various types of images such as a drawing, a letter, a symbol, and a logo for an image on a structure, conventionally, although the result would have naturalness due to the task being manually performed, it is actually difficult to expect a realistic value. Particularly, it is inevitable that a size of an output is considerably limited when producing a drawing, a pattern, or a picture based on a large output since it is not easy to express a single large image.

Due to the above reasons, an automatic printing apparatus for painting an outer wall of a structure or printing an image on a structure has been disclosed. However, there is difficulty expressing a large image due to a limitation in a printing range of the automatic printing apparatus.

SUMMARY OF THE INVENTION

An aspect of the present invention is to provide an image processing method, an automatic image printing method, and an automatic printing apparatus nozzle for maximizing printing efficiency when an image is printed on a target surface of a structure using an automatic printing apparatus.

According to an embodiment of the present invention, an image processing method is a method for processing an image that requires printing on a target surface of a structure and includes a first step of matching the image to the target surface, a second step of dividing the target surface into a plurality of preliminary divided regions by dividing the target surface along a first direction to satisfy a first condition, a third step of acquiring a first preliminary divided region which satisfies a second condition among the plurality of preliminary divided regions, a fourth step of dividing the target surface into a plurality of final divided regions, on the basis of a preliminary divided image included in the first preliminary divided region of the image matched to the target surface, by dividing the target surface along a second direction to satisfy a third condition, and a fifth step of setting a print starting position for respective final divided images included in the plurality of final divided regions by using a boundary line that defines the plurality of final divided regions.

According to an embodiment of the present invention, the first step of the image processing method may be a step of enlarging the image in a diagonal direction within a range in which an outer boundary of the image does not cross a boundary line that defines the target surface.

According to an embodiment of the present invention, in the image processing method, the first direction may be a direction in which the target surface is divided in a transverse direction, and the first condition may be, in a state in which an automatic printing apparatus including a nozzle configured to eject ink to the target surface is arranged at a predetermined position with respect to the structure, a condition related to a longitudinal movement range of the nozzle.

According to an embodiment of the present invention, in the image processing method, the second condition may be a condition related to an outer boundary of respective preliminary divided image included in the plurality of preliminary divided regions.

According to an embodiment of the present invention, in the image processing method, the second condition may be a condition related to a left outermost point based on the outer boundary of each of the preliminary divided images.

According to an embodiment of the present invention, in the image processing method, the second direction may be a direction in which the target surface is divided in a longitudinal direction, and the third condition may be, in a state in which an automatic printing apparatus including a nozzle configured to eject ink to the target surface is arranged at a predetermined position with respect to the structure, a condition related to a transverse movement range of the nozzle.

According to an embodiment of the present invention, the fourth step of the image processing method may be a step of dividing the target surface in the longitudinal direction on the basis of a longitudinal reference line including the left outermost point to satisfy the third condition.

According to an embodiment of the present invention, in the image processing method, when the left outermost point does not match the boundary line that defines the target surface, a region not printed with the image may be present between the boundary line that defines the target surface and the longitudinal reference line that includes the left outermost point.

According to an embodiment of the present invention, the fifth step of the image processing method may be a step of setting a print starting position of respective final divided images included in the plurality of final divided regions on the basis of an intersection point between the boundary line defining the target surface and a boundary line divided along the first direction, an intersection point between the boundary line defining the target surface and a boundary line divided along the second direction, and an intersection point between the boundary line divided along the first direction and the boundary line divided along the second direction.

According to an embodiment of the present invention, the fifth step of the image processing method may include a step of setting an intersection point between an upper transverse outer boundary of the target surface and the boundary line divided along the second direction as an initial starting point for printing the image.

According to another embodiment of the present invention, an automatic image printing method is a method for automatically printing an image on a target surface of a structure using an automatic printing apparatus that includes a nozzle configured to eject ink, and includes processing the image, locating the automatic printing apparatus on the target surface, and printing the image by the automatic printing apparatus, wherein the processing of the image includes a first step of matching the image to the target surface, a second step of dividing the target surface into a plurality of preliminary divided regions by dividing the target surface along a transverse direction to satisfy a first condition, a third step of acquiring a first preliminary divided region which satisfies a second condition among the plurality of preliminary divided regions, a fourth step of dividing the target surface into a plurality of final divided regions, on the basis of a preliminary divided image included in the first preliminary divided region of the image matched to the target surface, by dividing the target surface along a longitudinal direction to satisfy a third condition, and a fifth step of setting a print starting position for respective final divided images included in the plurality of final divided regions by using a boundary line that defines the plurality of final divided regions.

According to an embodiment of the present invention, in the automatic image printing method, the first condition may be, in a state in which an automatic printing apparatus including the nozzle configured to eject ink to the target surface is arranged at a predetermined position with respect to the structure, a condition related to a longitudinal movement range of the nozzle, the second condition may be a condition related to selecting a preliminary divided image that includes a left outermost point on the basis of an outer boundary of respective preliminary divided images included in the plurality of preliminary divided regions, and the third condition may be, in a state in which the automatic printing apparatus including the nozzle configured to eject ink to the target surface is arranged at a predetermined position with respect to the structure, a condition related to a transverse movement range of the nozzle.

According to another embodiment of the present invention, the fourth step of the automatic image printing method may be a step of dividing the target surface in the longitudinal direction on the basis of a longitudinal reference line including the left outermost point to satisfy the third condition.

According to another embodiment of the present invention, the fifth step of the automatic image printing method may be a step of setting a print starting position of respective final divided images included in the plurality of final divided regions on the basis of an intersection point between the boundary line defining the target surface and a boundary line divided along the transverse direction, an intersection point between the boundary line defining the target surface and a boundary line divided along the longitudinal direction, and an intersection point between the boundary line divided along the transverse direction and the boundary line divided along the transverse direction.

According to another embodiment of the present invention, the fifth step of the automatic image printing method may include a step of setting an intersection point between an upper transverse outer boundary of the target surface and the boundary line divided along the longitudinal direction as an initial starting point for printing the image, and the locating of the automatic printing apparatus on the target surface may include arranging the automatic printing apparatus at a position corresponding to the initial starting point.

According to another embodiment of the present invention, the printing of the image by the automatic printing apparatus of the automatic image printing method may include marking a point related to at least a part of an intersection point between the boundary line defining the target surface and the boundary line divided along the transverse direction, an intersection point between the boundary line defining the target surface and the boundary line divided along the longitudinal direction, and an intersection point between the boundary line divided along the transverse direction and the boundary line divided along the longitudinal direction on the target surface.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
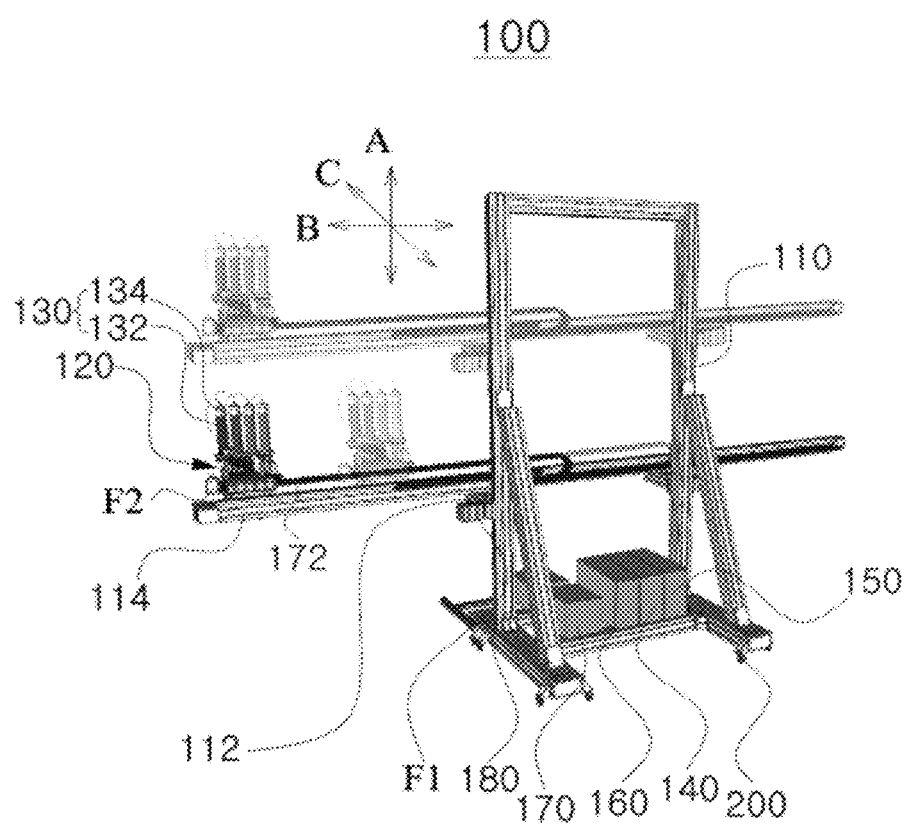
FIG. 1 is a schematic perspective view of an automatic printing apparatus according to an embodiment of the present invention.

Hereinafter, exemplary embodiments of the present invention will be described in detail with reference to the drawings. However, the spirit of the present invention is not limited to embodiments disclosed below, and those of ordinary skill in the art who understand the spirit of the present invention may easily propose another less advanced invention or another embodiment included within the scope of the spirit of the present invention by adding, changing, or omitting an element within the scope of the same spirit. However, these should also be construed as belonging to the scope of the spirit of the present invention.

In addition, like reference numerals will be used to describe like elements having the same functions within the scope of the same spirit illustrated in a drawing of each embodiment.

1. Automatic Printing Apparatus

Figure 2:
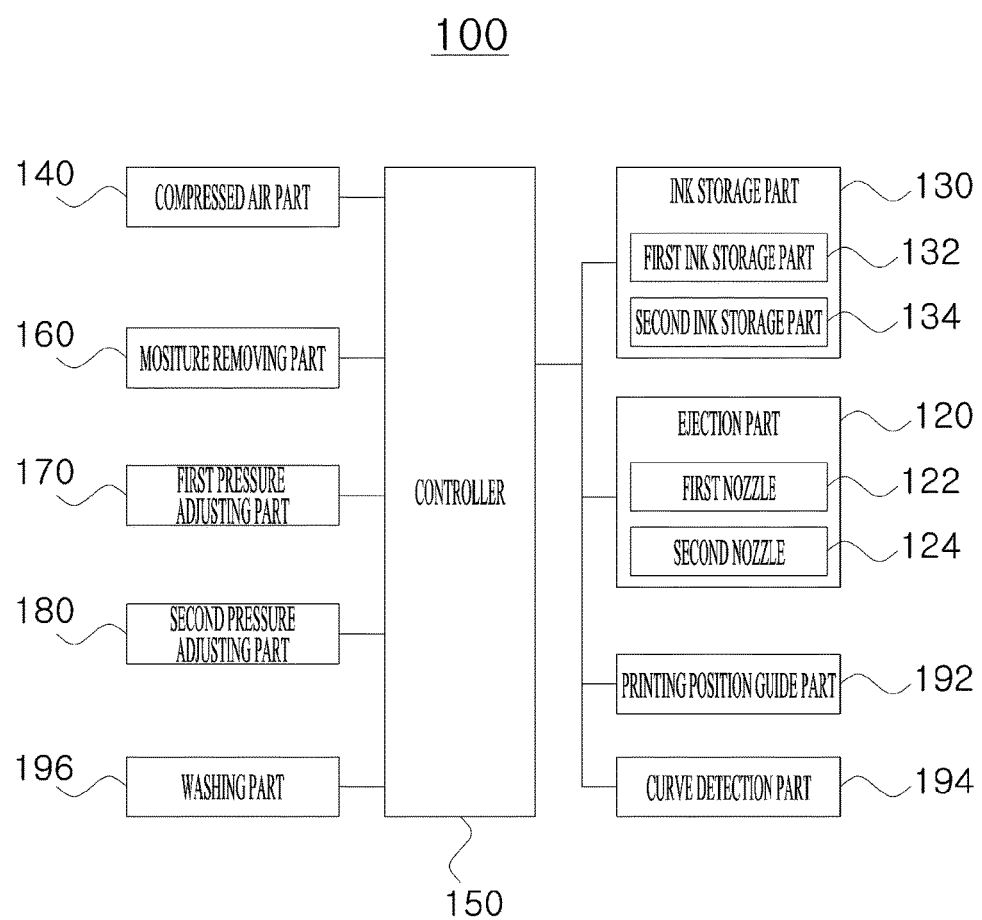
FIG. 2 is a block diagram of the automatic printing apparatus according to an embodiment of the present invention.

FIG. 1 is a schematic perspective view of an automatic printing apparatus according to an embodiment of the present invention, and FIG. 2 is a block diagram of the automatic printing apparatus according to an embodiment of the present invention.

Referring to FIGS. 1 and 2, an automatic printing apparatus 100 according to an embodiment of the present invention is a printing apparatus for automatically printing an image on a target surface, which requires various images such as a drawing, a letter, a symbol, and a logo, to be printed thereon, of an inner or outer wall of a structure (the target surface is at least a partial region of the inner wall or the outer wall of the structure) and may include a frame 110 serving as an overall supporting body, an ejection part 120 movably connected to the frame 110 and including one or more nozzles, an ink storage part 130 configured to supply ink to the one or more nozzles, a compressed air part 140 configured to provide an ejection force that allows the ink to be ejected through the one or more nozzles, and a controller 150 configured to control the ejection part 120.

Here, although the ejection part 120 may include one or more nozzles, an example in which the ejection part 120 includes a first nozzle 122 and a second nozzle 124 will be described hereinafter for convenience of description.

In addition, like the ejection part, although the ink storage part 130 may include one or more ink storage parts 130, an example in which the ink storage part 130 includes a first ink storage part 132 configured to store a first ink and a second ink storage part 134 for configured to store a second ink will be described for convenience of description.

The first ink stored in the first ink storage part 132 may be ejected through the first nozzle 122, and the second ink stored in the second ink storage part 134 may be ejected through the second nozzle 124. The first nozzle 122 and the first ink storage part 132 may correspond to each other, and the second nozzle 124 and the second ink storage part 134 may correspond to each other.

When an image requires printing on an outer wall of a structure, the automatic printing apparatus 100 may be moved to a position of a target surface by a crane or a gondola connected to a winch drum installed at a rooftop of the structure. When an image that requires printing on an inner wall of the structure, the automatic printing apparatus 100 may be moved to a desired position automatically or manually by wheels 200 in contact with the ground as illustrated in FIG. 1.

The frame 110 may provide an exterior of the automatic printing apparatus 100 according to an embodiment of the present invention and may support a vertical support frame 112, a horizontal support frame 114, and a longitudinal support frame to be disposed at predetermined positions.

The vertical support frame 112 may be controlled by the controller 150 and be moved in a vertical direction A on the frame 110. Thus, the vertical support frame 112 may move the horizontal support frame 114 in the vertical direction A so that the ejection part 120 is moved toward a target surface, which requires an image to be printed thereon.

Here, a force for moving the vertical support frame 112 in the vertical direction A may be provided by a vertical force providing part F1. Consequently, the controller 150 may control the vertical force providing part F1, which includes a motor and a rack gear, a pinion gear, and the like interlocking with rotation of the motor, and control a position of the vertical support frame 112.

In addition, when the vertical support frame 112 is moved in the vertical direction A by the vertical force providing part F1, the horizontal support frame 114 may also be moved in the vertical direction A as a result, and the ejection part 120 may be subsequently moved in a horizontal direction B on the horizontal support frame 114 by a force caused by a horizontal force providing part F2.

Meanwhile, the ejection part 120 may be moved in a longitudinal direction C toward a target surface. For this, the longitudinal support frame and a longitudinal force providing part may be connected to the frame 110.

As described above, the ejection part 120 may be moved within an area of a target surface, which requires an image to be printed thereon, of an inner or outer wall of a structure by the vertical support frame 112, the horizontal support frame 114, and the longitudinal support frame controlled by the controller 150, and may print a desired image on the target surface by ejecting ink while moving.

Ejecting the first ink and the second ink from the first nozzle 122 and the second nozzle 124 of the ejection part 120 may be realized by the compressed air part 140 providing an ejection force, and a series of process for ejecting the first ink and the second ink may be controlled by the controller 150.

Moisture may be removed from compressed air for providing the ejection force from the compressed air part 140 by a moisture removing part 160. Thus, the ink ejected from the ejection part 120 may be prevented from flowing down from the target surface.

In addition, a pressure of compressed air supplied to the ink storage part 130 and a pressure of compressed air supplied to the ejection part 120 after passing through the moisture removing part 160 may be adjusted by a first pressure adjusting part 170 and a second pressure adjusting part 180, respectively.

The first ink may be supplied from the first ink storage part 132 to the first nozzle 122 by the compressed air whose pressure is adjusted by the first pressure adjusting part 170, and the first ink supplied to the first nozzle 122 may be ejected to the target surface by repetitive elongation and contraction of a piezoelectric part 250 (see FIG. 4) which will be described below.

Here, an ejection force by which the first ink is ejected from the first nozzle 122 may be adjusted by ejection of the compressed air whose pressure is adjusted by the second pressure adjusting part 180, and this will be described below with reference to FIGS. 3 to 8.

Meanwhile, the second ink may be ejected from the second nozzle 124 to the target surface by the same principle as the first ink.

Specifically, the second ink may be supplied from the second ink storage part 134 to the second nozzle 124 by the compressed air whose pressure is adjusted by the first pressure adjusting part 170, and the second ink supplied to the second nozzle 124 may be ejected to the target surface by the repetitive elongation and contraction of the piezoelectric part 250.

Here, an ejection force by which the second ink is ejected from the second nozzle 124 may be adjusted by ejection of the compressed air whose pressure is adjusted by the second pressure adjusting part 180, and this will be described below with reference to FIGS. 3 to 8.

Meanwhile, a printing position guide part 192, a curve detection part 194, and a washing part 196 may be movably connected to the frame 110.

The printing position guide part 192 may guide a starting position for printing an image corresponding to each section when a single image to be printed on a target surface is divided and printed on at least one section of the target surface, and the curve detection part 194 may detect whether the target surface is curved.

Also, the washing part 196 may be a device for washing a region to which ink will be ejected before the ink is ejected.

Specifically, when an image to be printed on a target surface needs to be divided into a plurality of sections to be printed due to its size and the like, the controller 150 may control the divided printing and may control the printing position guide part 192 to guide a print starting position for a subsequent section when an image for the subsequent section is printed after an image corresponding to one section is printed. Thus, continuity of images between sections is realized, and accuracy in printing the whole image may be improved.

That is, the controller 150 may control the printing position guide part 192 so that the printing position guide part 192 matches a print starting position for each section of a target surface shown on a display to precisely control a starting point for ejecting ink from the ejection part 120 for each section.

Here, the printing position guide part 192 may be a light source for radiating light or a mechanical part, but is not necessarily limited thereto.

Meanwhile, an imaging device such as a camera may also be connected to the frame 110 for determining whether the printing position guide part 192 accurately matches a print starting position for each section of a target surface shown on the display.

The curve detection part 194 may determine a curve of a target surface and enable distance adjustment between a printing surface and the ejection part 120.

The controller 150 may control a position of the curve detection part 194 to be in contact with a target surface to detect a curve of the target surface based on a moving distance of the curve detection part 194 for the contact, and the curve detection part 194 may be detachably mounted on the ejection part 120.

In addition, the controller 150 may detect whether the target surface is curved based on a time or a distance for light irradiated from the curve detection part 194 toward the target surface to be reflected and returned to the curve detection part 194 from the target surface. In this case, the curve detection part 194 may be a light source such as an ultrasonic sensor.

Meanwhile, the curve detection part 194 may continuously or discontinuously detect a curved state of a target surface by the controller 150 in advance using a contact method or a non-contact method before ink is ejected by the ejection part 120, and may control the ejection part 120 based on a detected result to eject the ink.

That is, the controller 150 may control the longitudinal support frame based on a result detected by the curve detection part 194 to control a position of the ejection part 120 in the longitudinal direction, thereby allowing the most ideal ejection distance.

Consequently, the controller 150 may control a position of the ejection part 120 based on the result detected by the curve detection part 194 and the printing position guide part 192.

2. Automatic Printing Apparatus Nozzle

Figure 3:
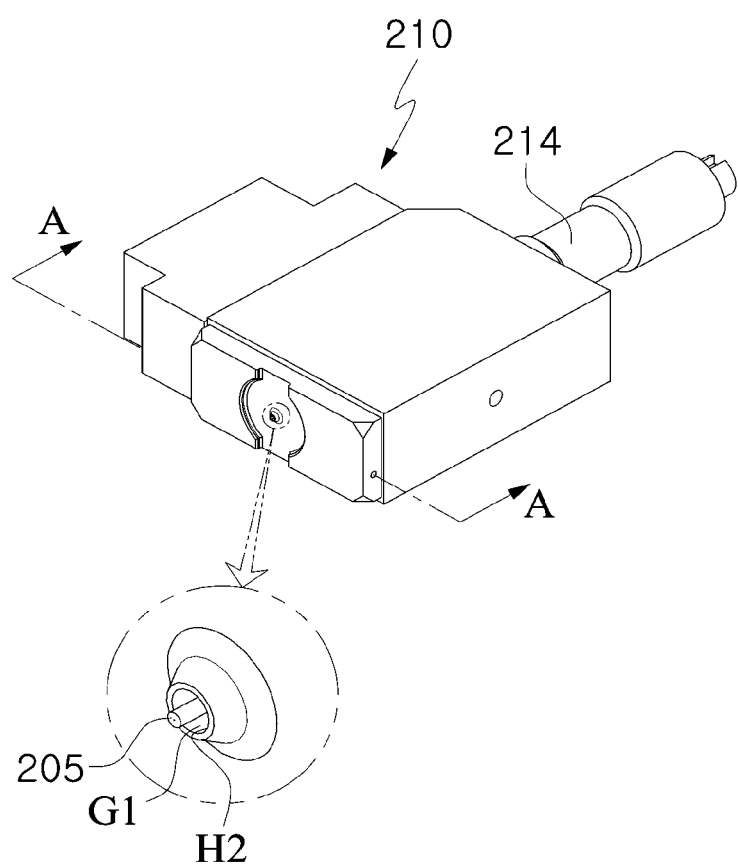
FIG. 3 is a schematic perspective view illustrating a nozzle provided in the automatic printing apparatus according to an embodiment of the present invention.
Figure 4:
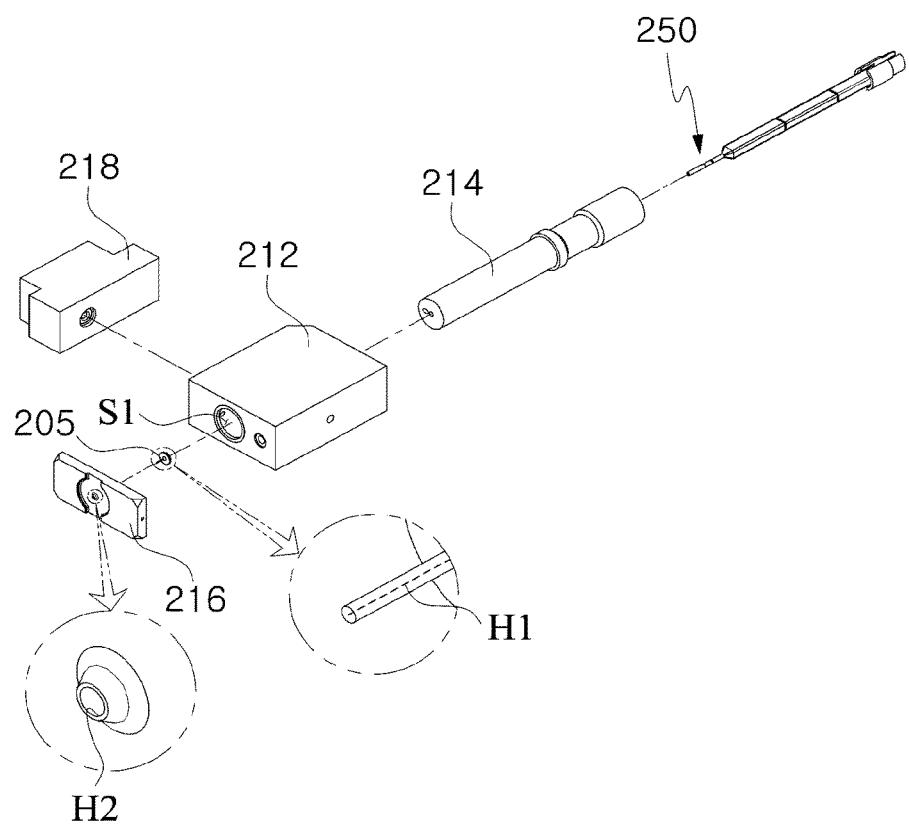
FIG. 4 is a schematic exploded perspective view illustrating the nozzle provided in the automatic printing apparatus according to an embodiment of the present invention.

FIG. 3 is a schematic perspective view illustrating a nozzle provided in the automatic printing apparatus according to an embodiment of the present invention, and FIG. 4 is a schematic exploded perspective view illustrating the nozzle provided in the automatic printing apparatus according to an embodiment of the present invention.

Figure 5:
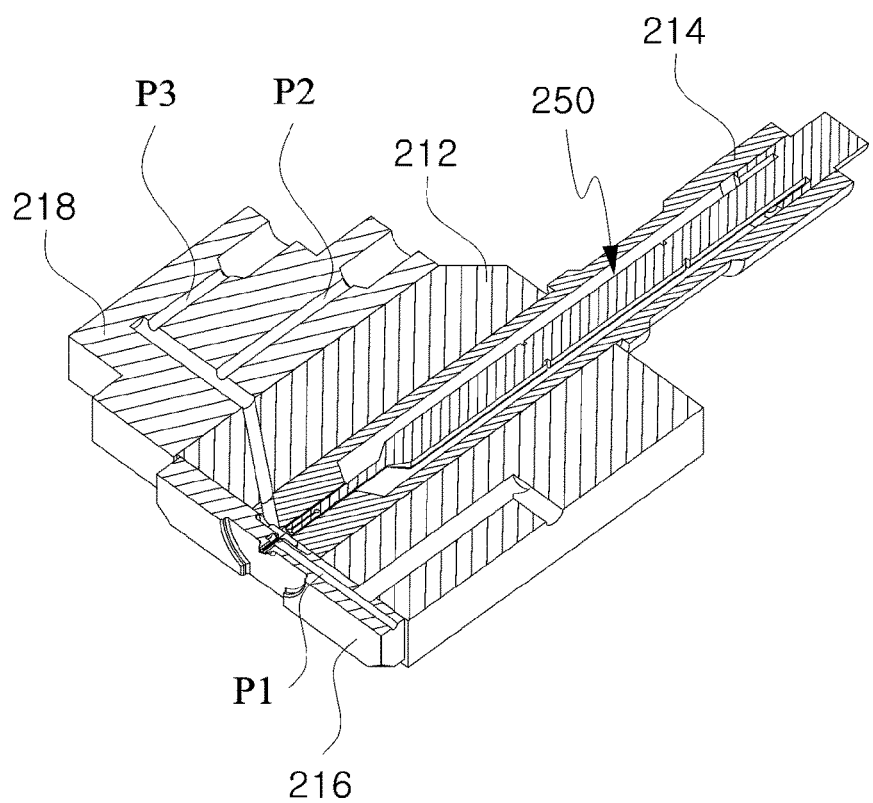
FIGS. 5 and 6 are schematic cross-sectional views taken along line A-A of FIG. 3.
Figure 6:
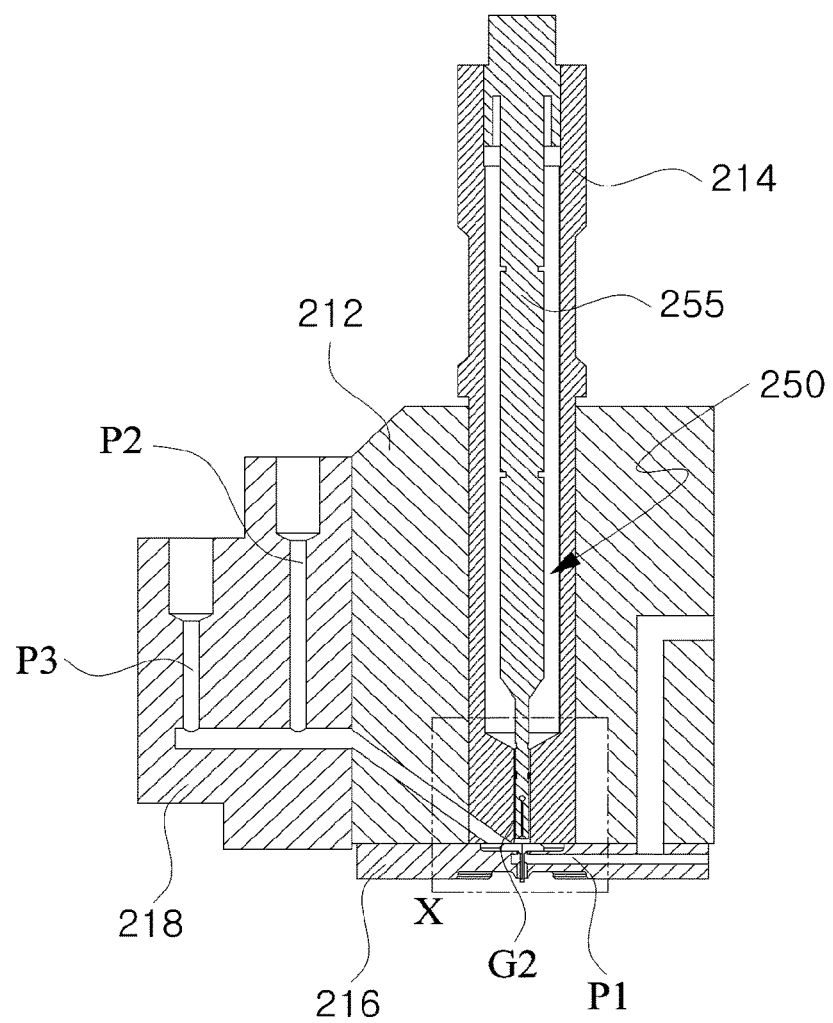
Figure 7:
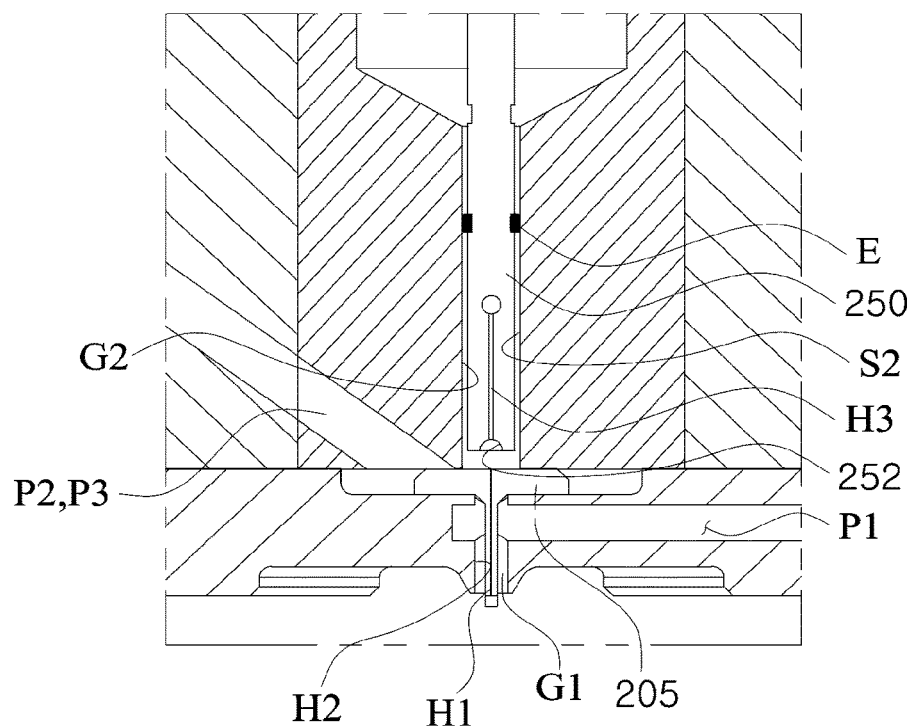
FIG. 7 is an enlarged view of X in FIG. 6.
Figure 8:
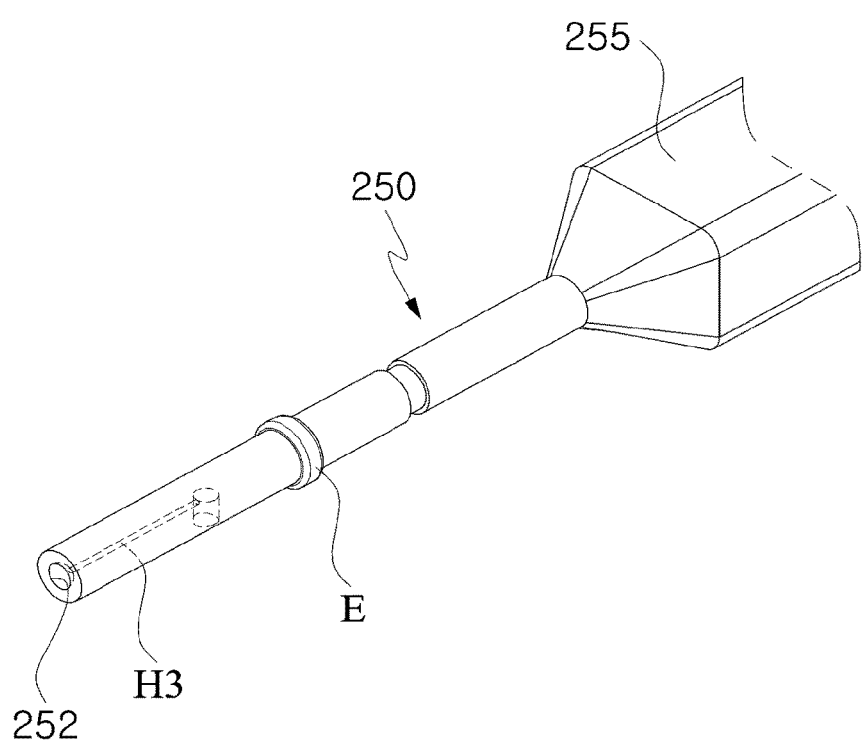
FIG. 8 is a schematic perspective view illustrating a piezoelectric part provided in the nozzle according to the present invention.

Also, FIGS. 5 and 6 are schematic cross-sectional views taken along line A-A of FIG. 3, FIG. 7 is an enlarged view of X in FIG. 6, and FIG. 8 is a schematic perspective view illustrating a piezoelectric part provided in the nozzle according to the present invention.

Referring to FIGS. 3 to 8, an automatic printing apparatus nozzle 200 according to the present invention may be the first nozzle 122 or the second nozzle 124 constituting the ejection part 120 of the automatic printing apparatus 100 described with reference to FIGS. 1 and 2.

The automatic printing apparatus nozzle 200 may include a nozzle tip 205 including an ejection hole H1 for ejecting ink, a main body part 210 forming an exterior and configured to fix the nozzle tip 205 to a predetermined position, and the piezoelectric part 250 configured to allow the ink to be ejected.

The main body part 210 may be realized using a plurality of parts to be easily assembled. For example, as illustrated in FIG. 4, the main body part 210 may include a first main body part 212, a second main body part 214, a third main body part 216, and a fourth main body part 218.

The first main body part 212 may have a first hollow S1 and accommodate therein the second main body part 214 having the piezoelectric part 250 accommodated therein, and the nozzle tip 205 may be arranged between the second main body part 214 and the third main body part 216.

The third main body part 216 may include a nozzle tip accommodating hole H2 that is formed to be penetrated to accommodate the nozzle tip 205, and when the nozzle tip 205 is accommodated in the nozzle tip accommodating hole H2, a gap G1 of a predetermined size is formed between an outer surface of the nozzle tip 205 and one surface that defines the nozzle tip accommodating hole H2.

The gap G1 may be a space to which the compressed air supplied from the compressed air part 140 described with reference to FIGS. 1 and 2 is ejected via a compressed air passage P1 formed in the main body part 210 after the pressure of the compressed air is adjusted by the second pressure adjusting part 180.

Here, the main body part 210 may include an inlet passage P2 via which ink is introduced from the ink storage part 130 to the ejection hole H1 by pressure being applied to the ink stored in the ink storage part 130 after the pressure of the compressed air supplied from the compressed air part 140 described with reference to FIGS. 1 and 2 is adjusted by the first pressure adjusting part 170.

The inlet passage P2 may communicate with the ejection hole H1, and the ink introduced through the inlet passage P2 may be introduced into a second hollow S2 of the second main body part 214 via one surface of the nozzle tip 205.

Specifically, the ink introduced via the inlet passage P2 may be introduced into a gap G2 between one surface that defines the hollow S2 and the piezoelectric part 205 accommodated in the second hollow S2. A range in which the ink can be introduced may be up to a rubber ring E arranged in the piezoelectric part 250.

When the ink is introduced via the inlet passage P2, the ink may be ejected to the outside via the ejection hole H1, and this may be realized by the repetitive elongation and contraction of the piezoelectric part 250.

The piezoelectric part 250 may include one or more piezoelectric bodies 255 and repeat elongation and contraction on the basis of an applied voltage, and the ejection hole H1 is realized to be repetitively closed and opened by the repetitive elongation and contraction of the piezoelectric part 250.

When the ejection hole H1 is opened due to the piezoelectric part 250, the ink is introduced into a recessed part 252 formed to be recessed at an end side of the piezoelectric part 250, and the ink introduced into the recessed part 252 may be ejected to the outside via the ejection hole H1 by the repetitive elongation and contraction of the piezoelectric part 250.

Consequently, the recessed part 252 may be a space in which the ink is temporarily stored before the ink is ejected via the ejection hole H1.

When the ink is ejected to the outside via the ejection hole H1, as described above, an ejection force of the ink is adjusted by the compressed air ejected via the gap G1 of a predetermined size formed between the outer surface of the nozzle tip 205 and the one surface defining the nozzle tip accommodating hole H2.

Meanwhile, when an introduction of ink via the inlet passage P2 is continued, although ink stagnation may occur due to a limitation in a size of a space of the recessed part 252, such a problem can be prevented by a drain hole H3 formed in the piezoelectric part 250 in the present invention.

The drain hole H3 may be a hole for communicating the recessed part 252 and the gap G2. When ink is continuously introduced via the inlet passage P2, a cycle in which the ink is continuously introduced into the recessed part 252, and some of the introduced ink is introduced into the gap G2 via the drain hole H3 and then introduced into the recessed part 252 again occurs.

Consequently, during continuous ejection of ink, ink stagnation does not occur.

Meanwhile, the main body part 210 may include a recovery passage P3 configured to communicate with the inlet passage P2 so that ink remaining in the inlet passage P2 after ink ejection is finished is recovered.

When the remaining ink is recovered via the recovery passage P3, an ink supply via the inlet passage P2 may be blocked by a valve (not illustrated) and the like, and the compressed air part 140 described with reference to FIGS. 1 and 2 may be used to recover the remaining ink.

That is, a suction force can be provided to the recovery passage P3 by the compressed air being ejected from the compressed air part 140 to a recovery part (not illustrated) configured to provide a space for recovering the remaining ink, and the remaining ink remaining in the inlet passage P2 is recovered to the recovery part via the recovery passage P3 by the suction force.

However, the suction force for recovering the remaining ink is not limited to be realized by the compressed air part 140.

3. Automatic Image Printing Method

Figure 9:
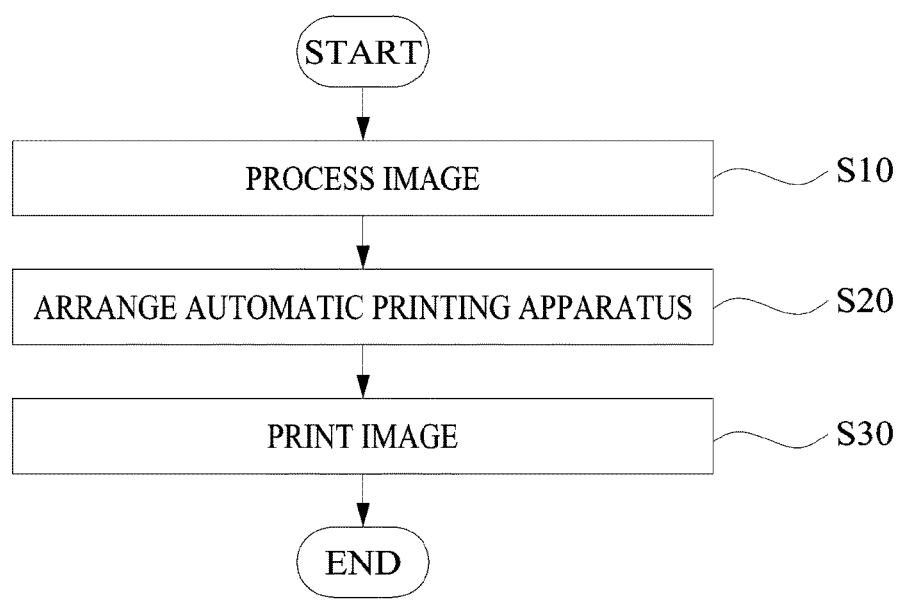
FIG. 9 is a flowchart for describing an automatic image printing method according to another embodiment of the present invention.
Figure 10:
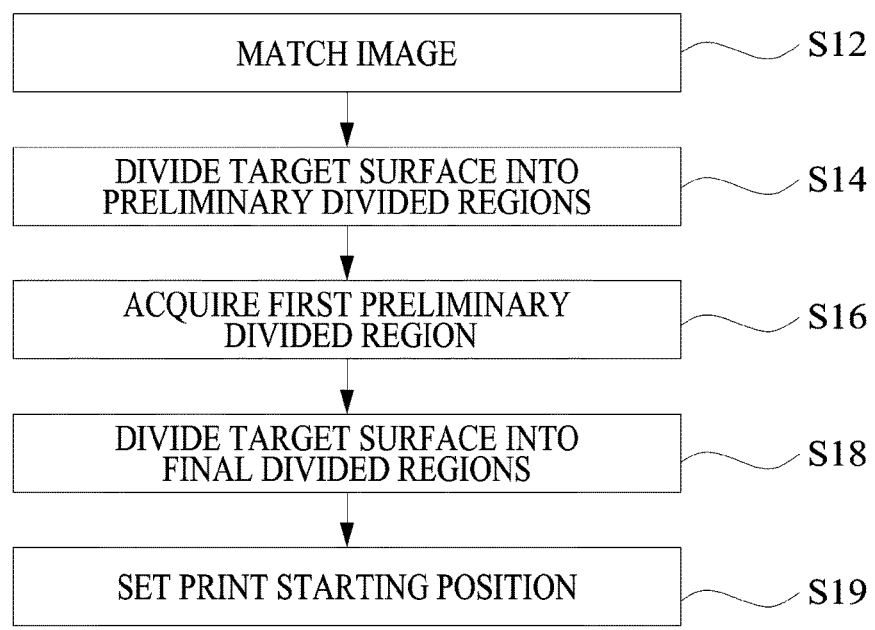
FIG. 10 is a flowchart for describing processing an image in the automatic image printing method according to another embodiment of the present invention.

FIG. 9 is a flowchart for describing an automatic image printing method according to another embodiment of the present invention, and FIG. 10 is a flowchart for describing processing an image in the automatic image printing method according to another embodiment of the present invention.

Also, FIGS. 11 to 17 are illustrative views for describing the processing of the image in the automatic image printing method according to another embodiment of the present invention.

Referring to FIGS. 9 and 10, an automatic image printing method according to another embodiment of the present invention may be a method for automatically printing an image on a target surface of a structure using the automatic printing apparatus described with reference to FIGS. 1 to 8.

The automatic image printing method may include processing an image (S10), arranging an automatic printing apparatus (S20), and printing an image (S30), and each step may be realized by the controller 150.

The automatic image printing method may further include cleaning up a target surface for cleaning a target surface which is at least a portion of an outer wall or an inner wall of a structure. The cleaning up of the target surface may include a process of removing a harmful deposit such as rust, dust, oil, tar, parget, plaster mortar, or the like generated on the target surface and also include a process of removing an old deteriorated paint film.

The cleaning up of the target surface may also include a process of cleaning up the target surface by repairing a defect, i.e., a groove, a hole, a crack, a deformation, a knot, a spot with non-uniform absorptivity, of the target surface so that printing an image thereon is facilitated.

The cleaning up of the target surface may also include a treating task for preventing harmful matter such as moisture, oil, resin, acid, alkali, and the like from being oozed out or being melted and coming out.

The cleaning up of the target surface may also include a process such as polishing as needed.

The cleaning up of the target surface may also include a process of covering, with protective paper, a non-printing region of the target surface on which an image is not printed to prevent ink stains on the non-printing region during image printing.

In addition, because the target surface may contain a large amount of moisture and alkali according to its characteristics, the cleaning up of the target surface may also include a process of drying the target surface to prevent discoloration of a printed image.

The processing of the image (S10) may be a type of an image processing step in which an image that requires printing is processed on a target surface of a structure.

The processing of the image (S10) may include a first step of matching the image to the target surface (S12), a second step of dividing the target surface into a plurality of preliminary divided regions (S14), a third step of acquiring a first preliminary divided region (S16), a fourth step of dividing the target surface into a plurality of final divided regions (S18), and a fifth step of setting a print starting position for respective final divided images included in the plurality of final divided regions (S19).

Hereinafter, each of the steps will be described in detail.

The first step of matching the image to the target surface (S12) may include displaying an outer wall O and a target surface T of a structure on a display D and enlarging an image required to be printed so that the image corresponds to the target surface T.

Figure 11:
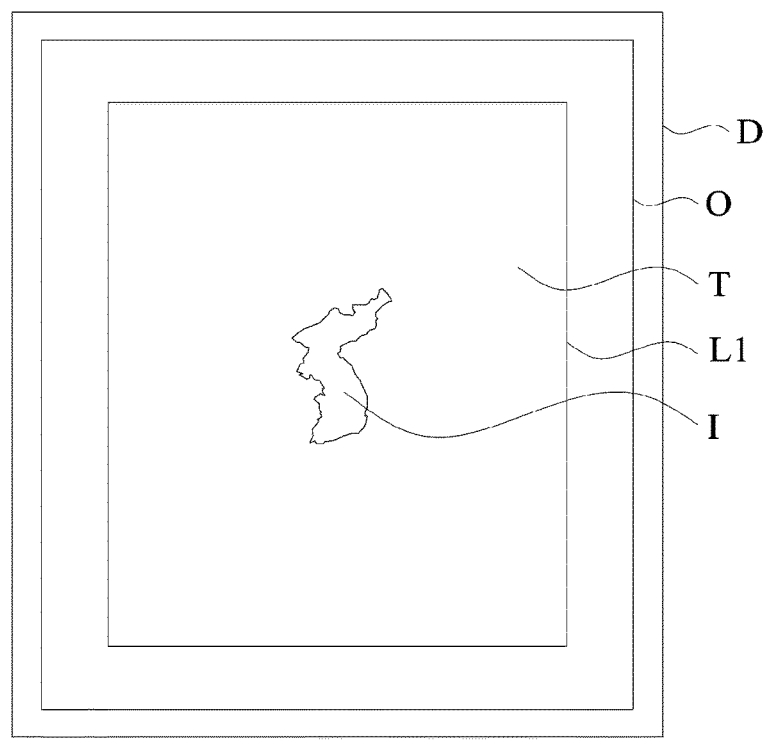
FIGS. 11 to 17 are illustrative views for describing the processing of the image in the automatic image printing method according to another embodiment of the present invention.

As illustrated in FIG. 11, by the first step (S12), the target surface T is displayed on the display D, and an image required to be printed, e.g., a Korea map image I, is displayed on the display D.

Also, the Korea map image I is enlarged in a diagonal direction within a range in which an outer boundary of the Korea map image I displayed on the display D does not cross a boundary line L1 that defines the target surface T.

Figure 12:
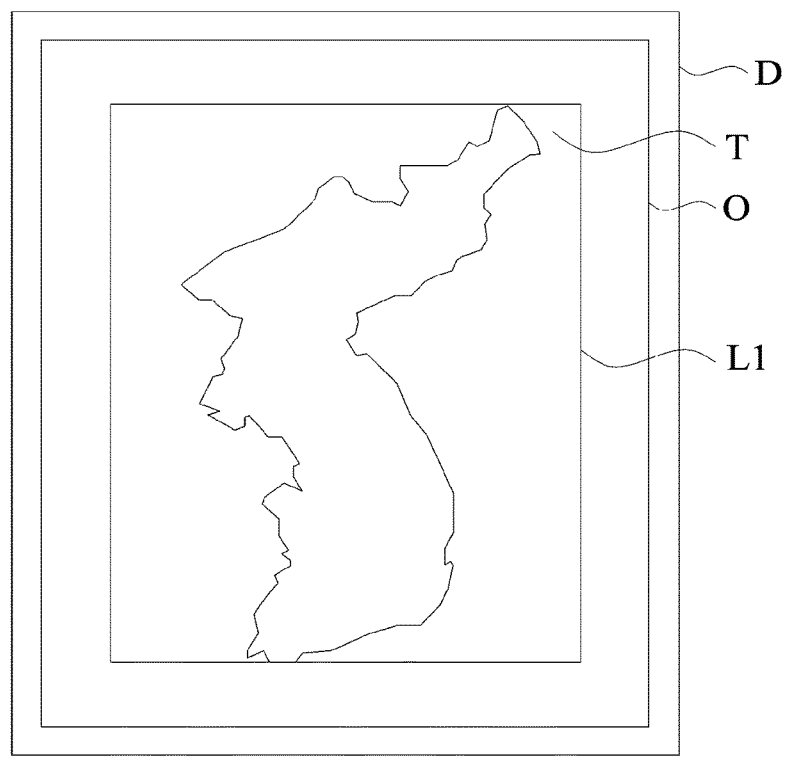

FIG. 12 illustrates a case in which the Korea map image I is enlarged in the diagonal direction until the outer boundary of the Korea map image I matches the boundary line L1 defining the target surface T.

Figure 13:
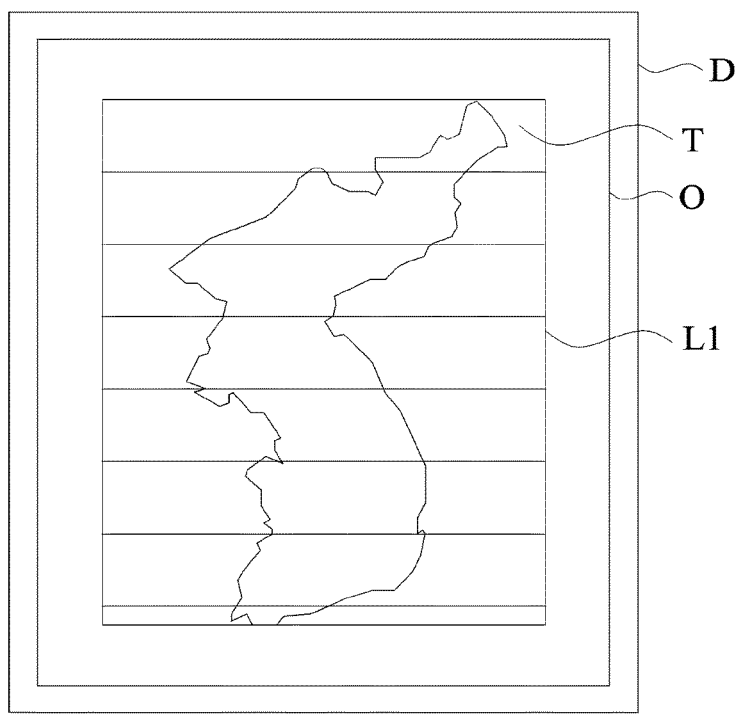

As illustrated in FIG. 13, the second step (S14) may be a step of dividing the target surface T into a plurality of preliminary divided regions by dividing the target surface along a first direction to satisfy a first condition.

FIG. 13 illustrates a state in which the target surface T is divided into eight preliminary divided regions.

Here, the first direction is a direction in which the target surface T is divided in a transverse direction and may be the same direction as the horizontal direction B described with reference to FIGS. 1 and 2.

Also, the first condition may be, in a state in which the automatic printing apparatus 100 including the nozzle 200 configured to eject ink to the target surface T is arranged at a predetermined position with respect to the structure, a condition related to a longitudinal movement range of the nozzle 200.

For example, the longitudinal movement range of the nozzle 200 may correspond to the vertical movement range of the vertical support frame 112 described with reference to FIGS. 1 and 2.

The third step (S16) is a step of acquiring a first preliminary divided region R1 that satisfies a second condition among the plurality of preliminary divided regions provided by the second step (S14), and the second condition may be a condition related to an outer boundary of respective preliminary divided images included in the plurality of preliminary divided regions.

Specifically, the second condition may be a condition related to the left outermost point based on the outer boundary of each of the preliminary divided images.

Figure 14:
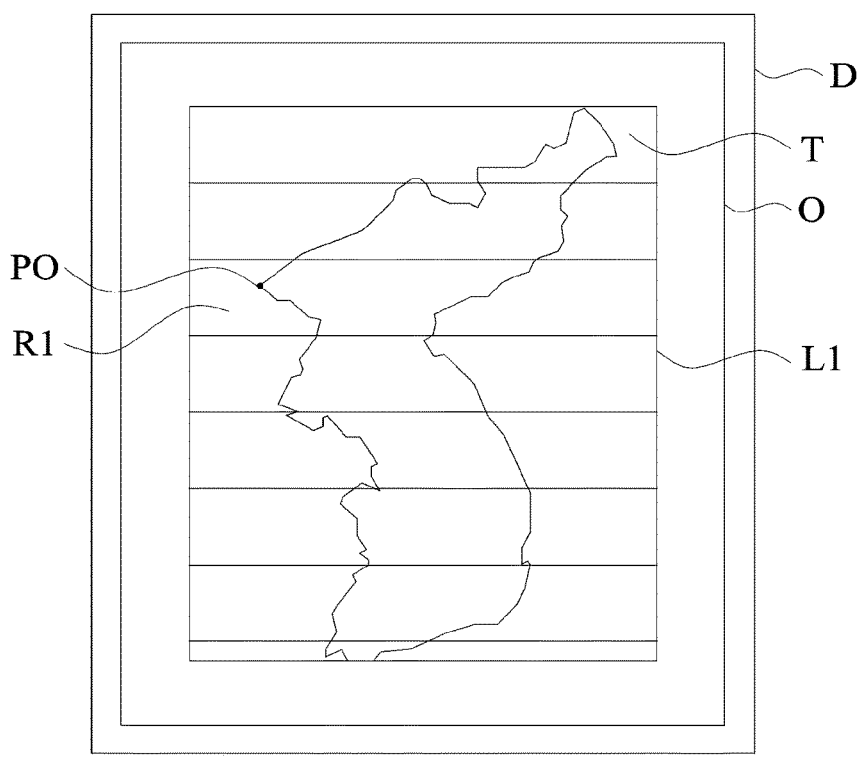
Figure 15:
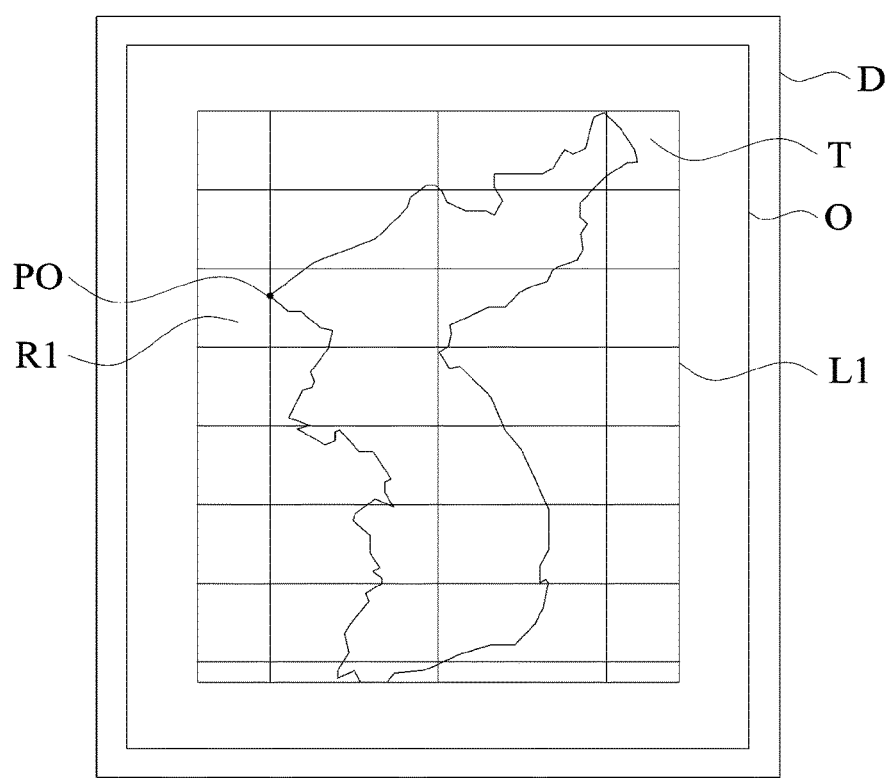

For example, as illustrated in FIG. 14, a preliminary divided image that includes a left outermost point PO based on the outer boundary of respective preliminary divided images included in the eight preliminary divided regions is an image included in a third preliminary divided region, and thus, the third preliminary divided region becomes the first preliminary divided region R1 that satisfies the second condition.

The fourth step (S18) may be a step of dividing the target surface T into a plurality of final divided regions by dividing the target surface T along a second direction, on the basis of the preliminary divided image included in the first preliminary divided region R1 of the image matched to the target surface T1, to satisfy a third condition.

Here, the second direction is a direction in which the target surface T is divided in the longitudinal direction and may be the same direction as the vertical direction A described with reference to FIGS. 1 and 2.

Also, the third condition may be, in the state in which the automatic printing apparatus 100 including the nozzle 200 configured to eject ink to the target surface T is arranged at the predetermined position with respect to the structure, a condition related to a transverse movement range of the nozzle 200.

For example, the transverse movement range of the nozzle 200 may correspond to a horizontal length of the horizontal support frame 114 described with reference to FIGS. 1 and 2.

The fourth step may be a step of dividing the target surface T in the longitudinal direction on the basis of a longitudinal reference line that includes the left outermost point PO to satisfy the third condition. For example, the total number of final divided regions may be 32 as illustrated in 15.

Figure 16:
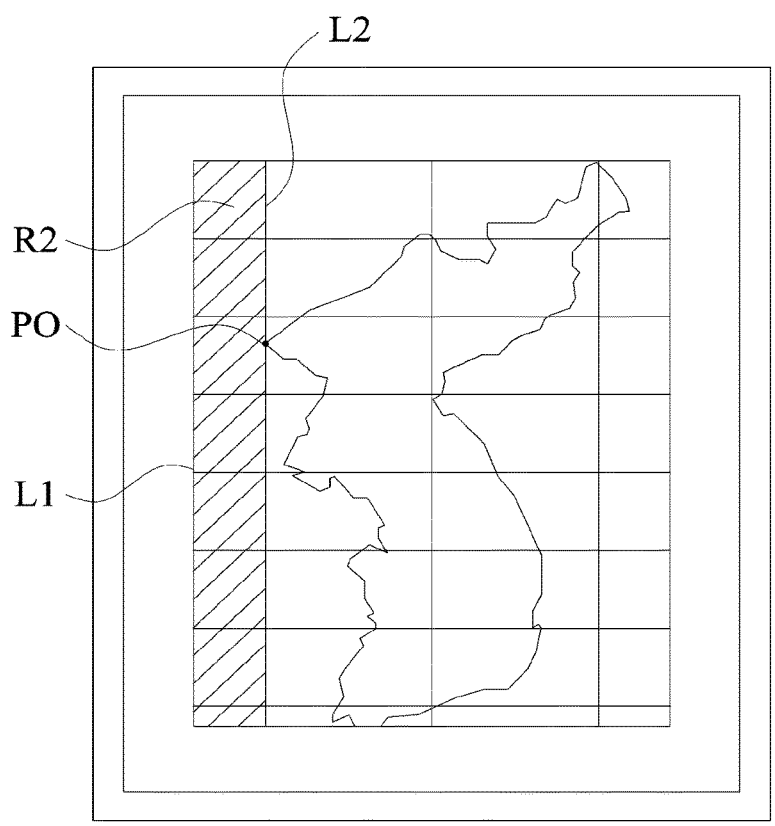

Meanwhile, when the left outermost point PO does not match the boundary line L1 defining the target surface T, as illustrated in FIG. 16, a region R2 that is not printed with the image may be present between the boundary line L1 defining the target surface T and a longitudinal reference line L2 including the left outermost point PO.

The fifth step (S19) may be a step of setting a print starting position for respective final divided images included in the plurality of final divided regions by using the boundary line that defines the plurality of final divided regions.

Specifically, the fifth step (S19) may be a step of setting a print starting position of respective final divided images included in the plurality of final divided regions on the basis of an intersection point between the boundary line L1 defining the target surface and a boundary line divided along the first direction, an intersection point between the boundary line L1 defining the target surface and a boundary line divided along the second direction, and an intersection point between the boundary line divided along the first direction and the boundary line divided along the second direction.

Figure 17:
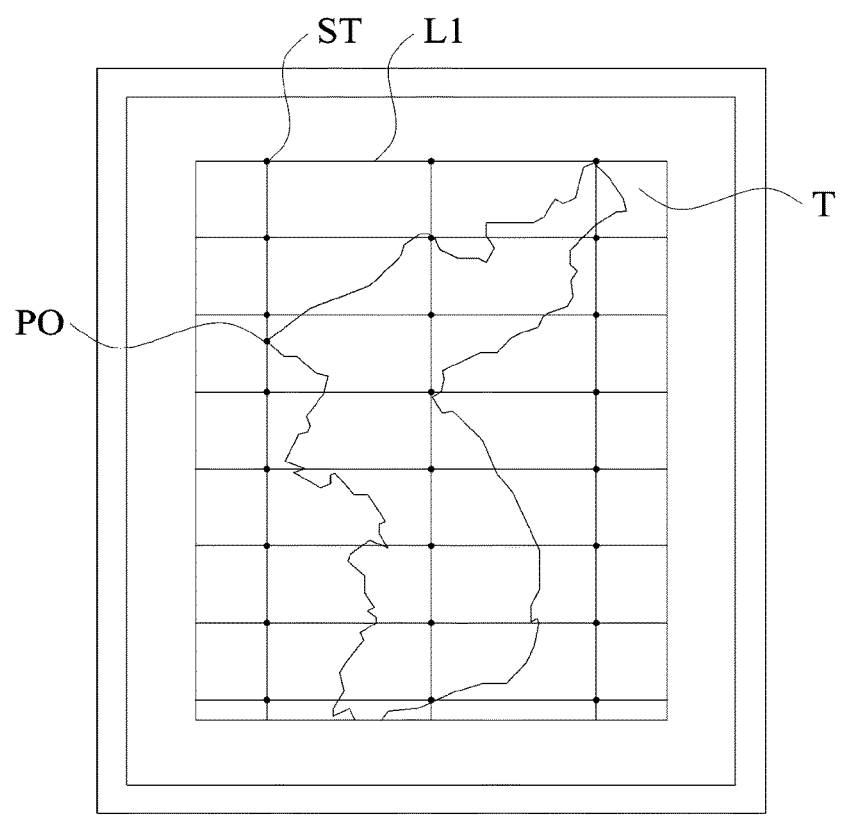

For example, as illustrated in FIG. 17, the intersection point between the boundary line L1 defining the target surface and the boundary line divided along the second direction and the intersection point between the boundary line divided along the first direction and the boundary line divided along the second direction may be print starting positions (displayed as dots), and the total of 24 thereof may be present.

Meanwhile, as illustrated in FIG. 17, the fifth step (S19) may include a step of setting an intersection point between an upper transverse boundary line of the target surface T and the longitudinal reference line L2 including the left outermost point PO as an initial starting point ST for printing the image.

As described above, when the first step (S12) to the fifth step (S19) are performed and the processing of the image (S10) is finished, the arranging of the automatic printing apparatus (S20) may be performed.

The arranging of the automatic printing apparatus (S20) is a step of locating the automatic printing apparatus 100 described with reference to FIGS. 1 and 2 on the target surface T and may include arranging the automatic printing apparatus 100 at a position corresponding to the initial starting point ST.

The arranging of the automatic printing apparatus (S20) may be a step of locating the automatic printing apparatus 100 on the target surface by connecting the automatic printing apparatus 100 to a crane or a gondola connected to a winch drum installed at a rooftop of the structure when an image requires printing on an outer wall of the structure, and may include levelling.

Here, the locating of the automatic printing apparatus 100 on the target surface may be performed before the processing of the image (S10).

The arranging of the automatic printing apparatus (S20) may include controlling the automatic printing apparatus 100 so that the printing position guide part 192 described with reference to FIGS. 1 and 2 corresponds to the initial starting point ST.

Here, although an imaging device that may be installed on the frame 110 may be used to arrange the automatic printing apparatus 100 so that the printing position guide part 192 corresponds to the initial starting point ST, embodiments are not necessarily limited thereto.

For example, the printing position guide part 192 of the automatic printing apparatus 100 may be displayed on the display D, and the automatic printing apparatus 100 may be controlled to be located at an optimal position so that the printing position guide part 192 displayed on the display D corresponds to the initial starting point ST displayed on the display D.

When the processing of the image (S10) and the locating of the automatic printing apparatus 100 on the target surface (S20) are finished, the printing of the image (S30) may be performed.

The printing of the image (S30) is a step of printing the image by the automatic printing apparatus 100, and the printing may be performed for each final divided region.

Here, the printing of the image (S30) may include marking a point related to at least a part of an intersection point between the boundary line L1 defining the target surface and a boundary line divided along the transverse direction, an intersection point between the boundary line L1 defining the target surface and a boundary line divided along the longitudinal direction, and an intersection point between the boundary line divided along the transverse direction and the boundary line divided along the longitudinal direction on the target surface of the structure.

For example, as illustrated in FIG. 17, a point indicating the print starting position may be directly marked on the target surface T of the structure.

When printing a final divided image included in a single final divided region is finished, printing a final divided image included in a subsequent final divided region may begin by controlling the crane or the gondola connected to the winch drum installed at the rooftop of the structure. Here, a print starting position may be accurately controlled on the basis of the point marked on the target surface T.

In this case, the print starting position may be set using the printing position guide part 192. Detailed description thereof will be omitted.

Meanwhile, when printing respective final divided images included in all of the final divided regions is finished, the recovering of the remaining ink described with reference to FIGS. 3 to 8 may be additionally performed.

Meanwhile, each of the steps of the above-described automatic image printing method may be realized as a computer-readable code in a computer-readable recording medium. The computer-readable recording medium includes all types of recording devices in which data readable by a computer system is stored. Examples of the computer-readable recording medium include a read-only memory (ROM), a random access memory (RAM), a compact disc (CD)-ROM, a magnetic tape, a floppy disk, and an optical data storage device. Further, the computer-readable recording medium may be implemented in the form of a carrier wave (such as Internet transmission). In addition, the computer-readable recording medium may be distributed to computer systems over a network, in which computer readable codes may be stored and executed in a distributed manner.

According to the present invention, by an image processing method, an automatic image printing method, and an automatic printing apparatus nozzle, printing efficiency can be maximized when an image is printed on a target surface of a structure using an automatic printing apparatus.

Further, accuracy of a printed image can be improved when a large image is printed on a target surface of a structure.

Although configurations and features of the present invention have been described above based on embodiments according to the present invention, the present invention is not limited thereto. It should be apparent to those of ordinary skill in the art to which the present invention pertains that the present invention may be modified and changed in various ways within the spirit and scope of the present invention. Consequently, it should be noted that such modifications and changes belong to the appended claims.

What is claimed is:

1. An image processing method, which is a method for processing an image that requires printing on a target surface of a structure, the method comprising:
a first step of determining a curved state of the target surface based on a time for light irradiated from an ultrasonic sensor of an automatic printing apparatus towards the target surface to be reflected and returned to the ultrasonic sensor from the target surface;
a second step of matching the image to the target surface;
a third step of dividing the target surface into a plurality of preliminary divided regions, by dividing the target surface along a first direction to satisfy a first condition, wherein in the first direction the target surface is divided in a transverse direction, and wherein the first condition is related to a longitudinal movement range of a nozzle configured to eject ink to the target surface in a state in which the automatic printing apparatus including the nozzle is arranged at a predetermined position with respect to the structure and based on determining the curved state of the target surface;
a fourth step of acquiring a first preliminary divided region which satisfies a second condition among the plurality of preliminary divided region, wherein the second condition is related to an outer boundary of a respective preliminary divided image included in the plurality of preliminary divided regions and where in the second condition is related to a left outermost point based on the outer boundary of each of the preliminary divided images;
a fifth step of dividing the target surface into a plurality of final divided regions, on the basis of a preliminary divided image included in the first preliminary divided region of the image matched to the target surface, by dividing the target surface along a second direction to satisfy a third condition, wherein in the second direction, the target surface is divided in a longitudinal direction, and wherein the third condition is related to a transverse movement range of the nozzle in a state in which the automatic printing apparatus including a nozzle configured to eject ink to the target surface is arranged at a predetermined position with respect to the structure, wherein the fifth step divides the target surface in the longitudinal direction on the basis of a longitudinal reference line including the left outermost point to satisfy the third condition, wherein the left outermost point does not match a boundary line that defines the target surface, a region not printed with the image is present between the boundary line that defines the target surface and the longitudinal reference line that includes the left outermost point; and a sixth step of setting a print starting position for respective final divided images included in the plurality of final divided regions by using a boundary line that defines the plurality of final divided regions.

2. The image processing method of claim 1, wherein the second step is a step of enlarging the image in a diagonal direction within a range in which an outer boundary of the image does not cross a boundary line that defines the target surface.

3. The image processing method of claim 1, wherein the sixth step is a step of setting a print starting position of respective final divided images included in the plurality of final divided regions on the basis of an intersection point between the boundary line defining the target surface and a boundary line divided along the first direction, an intersection point between the boundary line defining the target surface and a boundary line divided along the second direction, and an intersection point between the boundary line divided along the first direction and the boundary line divided along the second direction.

4. The image processing method of claim 3, wherein the sixth step includes a step of setting an intersection point between an upper transverse outer boundary of the target surface and the boundary line divided along the second direction as an initial starting point for printing the image.

5. An automatic image printing method, which is for automatically printing an image on a target surface of a structure using an automatic printing apparatus that includes a nozzle configured to eject ink, the method comprising:
  processing the image;
  locating the automatic printing apparatus on the target surface;
  a curved state of the target surface based on a time for light irradiated from an ultrasonic sensor of the automatic printing apparatus towards the target surface to be reflected and returned to the ultrasonic sensor from the target surface; and
  printing the image by the automatic printing apparatus based on determining the curved state of the target surface,
  wherein the processing of the image includes:
    a first step of matching the image to the target surface;
    a second step of dividing the target surface into a plurality of preliminary divided regions by dividing the target surface along a transverse direction to satisfy a first condition, the first condition is, in a state in which the automatic printing apparatus including the nozzle configured to eject ink to the target surface is arranged at a predetermined position with respect to the structure, a condition related to a longitudinal movement range of the nozzle;
    a third step of acquiring a first preliminary divided region which satisfies a second condition among the plurality of preliminary divided regions, the second condition is, in a condition for selecting a preliminary divided image that includes a left outermost point on the basis of an outer boundary of respective preliminary divided images included in the plurality of preliminary divided regions;
    a fourth step of dividing the target surface into a plurality of final divided regions, on the basis of a preliminary divided image included in the first preliminary divided region of the image matched to the target surface, by dividing the target surface along a longitudinal direction to satisfy a third condition, the third condition is, in a state in which the automatic printing apparatus including the nozzle configured to eject ink to the target surface is arranged at a predetermined position with respect to the structure, a condition related to a transverse movement range of the nozzle, and wherein the fifth step is a step of dividing the target surface in the longitudinal direction on the basis of a longitudinal reference line including the left outermost point to satisfy the third condition, wherein the left outermost point does not match a boundary line that defines the target surface, a region not printed with the image is present between the boundary line that defines the target surface and the longitudinal reference line that includes the left outermost point; and
    a fifth step of setting a print starting position for respective final divided images included in the plurality of final divided regions by using a boundary line that defines the plurality of final divided regions.

6. The automatic image printing method of claim 5, wherein the fifth step is a step of setting a print starting position of respective final divided images included in the plurality of final divided regions on the basis of an intersection point between the boundary line defining the target surface and a boundary line divided along the transverse direction, an intersection point between the boundary line defining the target surface and a boundary line divided along the longitudinal direction, and an intersection point between the boundary line divided along the transverse direction and the boundary line divided along the longitudinal direction.

7. The automatic image printing method of claim 6, wherein:
  the fifth step includes a step of setting an intersection point between an upper transverse outer boundary of the target surface and the boundary line divided along the longitudinal direction as an initial starting point for printing the image; and
  the locating of the automatic printing apparatus on the target surface includes arranging the automatic printing apparatus at a position corresponding to the initial starting point.

8. The automatic image printing method of claim 6, wherein the printing of the image by the automatic printing apparatus includes marking a point related to at least a part of an intersection point between the boundary line defining the target surface and the boundary line divided along the transverse direction, an intersection point between the boundary line defining the target surface and the boundary line divided along the longitudinal direction, and an intersection point between the boundary line divided along the transverse direction and the boundary line divided along the longitudinal direction on the target surface.

9. The image processing method of claim 1, wherein determining the curved state of the target surface further comprises:
  enabling a distance adjustment between the target surface and the nozzle.

* * * * *